(12) United States Patent
Ima

(10) Patent No.: US 6,755,090 B2
(45) Date of Patent: Jun. 29, 2004

(54) RETAINING MECHANISM FOR TRANSMISSION GEARS

(76) Inventor: Akihiro Ima, 2-18-1, Inadera, Amagasaki (JP)

(*) Notice: Subject to any disclaimer, the term of this patent is extended or adjusted under 35 U.S.C. 154(b) by 7 days.

(21) Appl. No.: 10/322,769

(22) Filed: Dec. 19, 2002

(65) Prior Publication Data

US 2003/0116397 A1 Jun. 26, 2003

(30) Foreign Application Priority Data

Dec. 26, 2001 (JP) .................................. 2001-394161

(51) Int. Cl.⁷ .......................... F16H 3/083; F16D 11/14
(52) U.S. Cl. .................. 74/330; 192/48.91; 192/69.9; 192/114 T
(58) Field of Search ............................. 192/48.91, 69.9, 192/108, 114 T; 74/330

(56) References Cited

U.S. PATENT DOCUMENTS

| 2,070,140 | A | * | 2/1937 | Peterson et al. | 192/114 T |
|---|---|---|---|---|---|
| 2,535,388 | A | * | 12/1950 | Burks et al. | 192/48.91 |
| 2,613,781 | A | * | 10/1952 | Polomski et al. | 192/69.9 |
| 3,043,414 | A | * | 7/1962 | Peras | 192/114 T |
| 3,219,164 | A | * | 11/1965 | Henyon | 192/114 T |
| 3,424,289 | A | * | 1/1969 | Bessot | 192/108 |
| 3,918,560 | A | * | 11/1975 | Zach, Jr. | 192/114 T |
| 2003/0074993 | A1 | * | 4/2003 | Schupp | 74/339 |

FOREIGN PATENT DOCUMENTS

| JP | 04212633 A | * | 8/1992 | B60K/17/352 |
|---|---|---|---|---|

* cited by examiner

Primary Examiner—Richard M. Lorence
(74) Attorney, Agent, or Firm—Sterne, Kessler, Goldstein & Fox P.L.L.C.

(57) ABSTRACT

A gear retaining mechanism is provided for a transmission comprising a rotary shaft, a hub fixed on the rotary shaft, a clutch slider axially slidably fitted on the hub, and a gear relatively rotatably provided on the rotary shaft. The hub is provided on an outer periphery thereof with a male spline having an axially tapered portion. The clutch slider is provided on an inner periphery thereof with a female spline meshing with the male spline of the hub. The gear is provided on an outer periphery thereof with a male spline to mesh with the female spline of the clutch slider. The male spline of the gear includes an axially tapered portion. The clutch slider is slid along the rotary shaft and located so as to fix the gear to the rotary shaft through the hub so that the female spline meshes with the male spline of the gear.

14 Claims, 13 Drawing Sheets

(b)

(a)
(b)

(a)
(b)

(a)
(b)

RETAINING MECHANISM FOR TRANSMISSION GEARS

BACKGOUND OF THE INVENTION

1. Field of the Invention

The present invention relates to a retaining mechanism for gears of a constantly meshing gear transmission, wherein the retaining mechanism prevents gears from slipping while restricting operational force for speed changing.

2. Background Art

A conventional constantly meshing gear transmission is constructed as follows. A rotary shaft to be variably rotated is provided thereon with a plurality of relatively rotatable transmission gears and at least one fixed hub. The hub is disposed between two adjacent gears and formed on the outer peripheral surface thereof with a male spline. Each of the adjacent gears forms a boss on a side thereof facing the hub. A male spline is formed on the outer peripheral surface of the boss. A clutch slider is axially slidably fitted on the hub so that a female spline provided on the inner periphery of the clutch slider constantly meshes with the male spline of the hub.

A fork is connected to the clutch slider and fixed to a fork shaft. By manipulating a shift lever for shifting (speed changing), the fork shaft moves axially together with the clutch slider so that the female spline of the clutch slider selectively meshes with the male spline of one of the adjacent gears with the hub therebetween so as to fix the selected gear to the rotary shaft through the hub, thereby rotating the rotary shaft at the speed corresponding to the selected gear.

In such a construction, a detent mechanism for holding the clutch slider in place while allowing the clutch slider to slide thereacross is provided on the fork shaft or any member interlocking with the fork shaft. However, the clutch slider engaging with the gear through the splines sometimes slips from the gear naturally. This phenomenon results in unexpected shifting (change to a different speed or to neutral). To avoid the phenomenon, a spring of the detent mechanism may be strengthened so as to increase the force for retaining the clutch slider. The increased force of the detent mechanism is advantageous in retaining the clutch slider; however, the shift lever becomes too heavy to be manipulated for intentionally sliding the clutch slider across the detent mechanism.

SUMMARY OF THE INVENTION

An object of the present invention is to provide a gear retaining mechanism for a constantly meshing gear transmission wherein a clutch slider is retained in place steadily without increasing the force of the detent mechanism for retaining the clutch slider. The constantly meshing gear transmission comprises a rotary shaft, a hub fixed on the rotary shaft, the hub being provided on an outer periphery thereof with a male spline, a clutch slider axially slidably fitted on the hub, the clutch slider being provided on an inner periphery thereof with a female spline constantly meshing with the male spline of the hub, and a gear relatively rotatably provided on the rotary shaft, the gear being provided on an outer periphery thereof with a male spline enabled to mesh with the female spline of the clutch slider. The clutch slider is slid along the rotary shaft for fixing the gear to the rotary shaft through the hub so that the female spline, while meshing with the male spline of the hub, meshes with the male spline of the gear.

To achieve the object, according to the present invention, each of the male splines of the hub and the gear has an axially tapered portion. Preferably, the tapered portion of the male spline of the hub is narrowed axially oppositely to the tapered portion of the male spline of the gear. When the female spline, while meshing with the male spline of the hub, meshes with the male spline of the gear, the female spline abuts at opposite axial ends thereof against the tapered portion of the male spline of the gear and the tapered portion of the male spline of the hub so as to retain the clutch slider.

The gear is rotated by a prime mover so as to press the tapered portion of the male spline of the gear against the female spline of the clutch slider, thereby forcing the female spline in one axial direction. On the other hand, the hub fixed on the rotary shaft, to which ground load applied on a grounding wheel of a vehicle is transmitted, tends to resist the rotation of the clutch slider engaging with the gear so as to press the taper portion of the male spline of the gear against the female spline of the clutch slider, thereby forcing the female spline of the clutch slider in axially opposite direction.

Consequently, while the vehicle travels in the setting speed of the gear, the female spline is forced in axially opposite directions. In other words, each end of the female spline is difficult to move toward the wider end of the corresponding tapered portion abutting against it because great force is required to move the female spline in such a way. The great force is equal to the normal operation force for shifting the clutch slider and is greater than a force naturally applied on the normally sliding clutch slider, which is a differential force generated between the upstream and downstream portions of the rotary shaft.

Usually, a plurality of gears serve as the gear. Whichever gear of the plurality of gears may be selected to be fixed to the rotary shaft by the clutch slider through the hub, the female spline, while meshing with the male spline of the hub, meshes with the male spline of the selected gear so that the female spline abuts at opposite axial ends thereof against the tapered portion of the male spline of the selected gear and the tapered portion of the male spline of the hub, thereby stably retaining the clutch slider.

Suppose that a pair of first and second gears serving as the plurality of gears are disposed on one side of the hub so that the male spline of the first gear is disposed between the male spline of the second gear and the male spline of the hub. To correspond to such arranged first and second gears, the female spline of the clutch slider is provided at opposite ends thereof with a first tooth and a second tooth. When the clutch slider meshes with the second gear and the hub so as to select the second gear to be fixed to the rotary shaft, the male spline of the second gear meshes with the first tooth, and the male spline of the hub meshes with the second tooth. At this time, the male spline of the first gear is allowed to pass through a gap in the female spline of the clutch slider between the first tooth and the second tooth. Thus, a single clutch slider may be used for selecting one of the first and second gears disposed on one side of the hub, thereby reducing the number of parts, costs, and the size of the transmission.

When the clutch slider meshes with the first gear and the hub so as to select the first gear to be fixed to the rotary shaft, the tapered portion of the male spline of the first gear abutting against the first tooth is narrowed axially oppositely to the tapered portion of the male spline of the hub abutting against the second tooth, and when the clutch slider meshes with the second gear and the hub so as to select the second gear to be fixed to the rotary shaft, the tapered portion of the male spline of the second gear abutting against the first tooth is narrowed axially oppositely to the tapered portion of the male spline of the hub abutting against the second tooth. Thus, whichever gear of the first and second gears may mesh with the clutch slider, the clutch slider is securely retained in place.

Correspondingly, the male spline of the hub may include a pair of first and second tapered portions. The second tooth of the female spline of the clutch slider abuts against the first tapered portion when the first tooth of the female spline of the clutch slider abuts against the tapered portion of the male spline of the first gear. The second tooth of the female spline of the clutch slider abuts against the second tapered portion when the first tooth of the female spline of the clutch slider abuts against the tapered portion of the male spline of the second gear.

If the tapered portions of the respective first and second gears are narrowed axially oppositely to each other, the first tapered portion is narrowed axially oppositely to the second tapered portion in the female spline of the clutch slider.

If the vehicle equipped with the transmission is provided with a parking brake, the clutch slider may be enabled to mesh with the first gear, the second gear, and the hub together so as to fix both the first gear and the second gear to the rotary shaft, thereby corresponding to the actuation of the parking brake.

A third gear, which is provided on an outer periphery thereof with a male spline to mesh with the female spline of the clutch slider, may be relatively rotatably provided on the rotary shaft so that the male spline of the hub is disposed between the male spline of the first gear and the male spline of the third gear. The first and second gears may have different rotary speeds in the same rotational direction, and the third gear may be rotated oppositely to the first and second gears. Such three gears are enabled to be selectively fixed to the rotary shaft through the hub by a single clutch slider, thereby reducing the number of parts, costs, and the size of the transmission.

For securely retaining the clutch slider meshing with the third gear, the third gear may also serve as one of the plurality of gears including the male spline having the tapered portion. When the clutch slider meshes with the third gear and the hub so as to select the third gear to be fixed to the rotary shaft, the second tooth abuts against the tapered portion of the male spline of the third gear, and the first tooth abuts against the tapered portion of the male spline of the hub. Furthermore, the tapered portion of the male spline of the third gear abutting against the second tooth may be narrowed axially oppositely to the tapered portion of the male spline of the hub abutting against the first tooth.

These, other and further objects, features and advantages will appear more fully from the following description.

BRIEF DESCRIPTION OF THE DRAWINGS/FIGURES

DETAILED DESCRIPTION OF THE INVENTION

Figure 1:
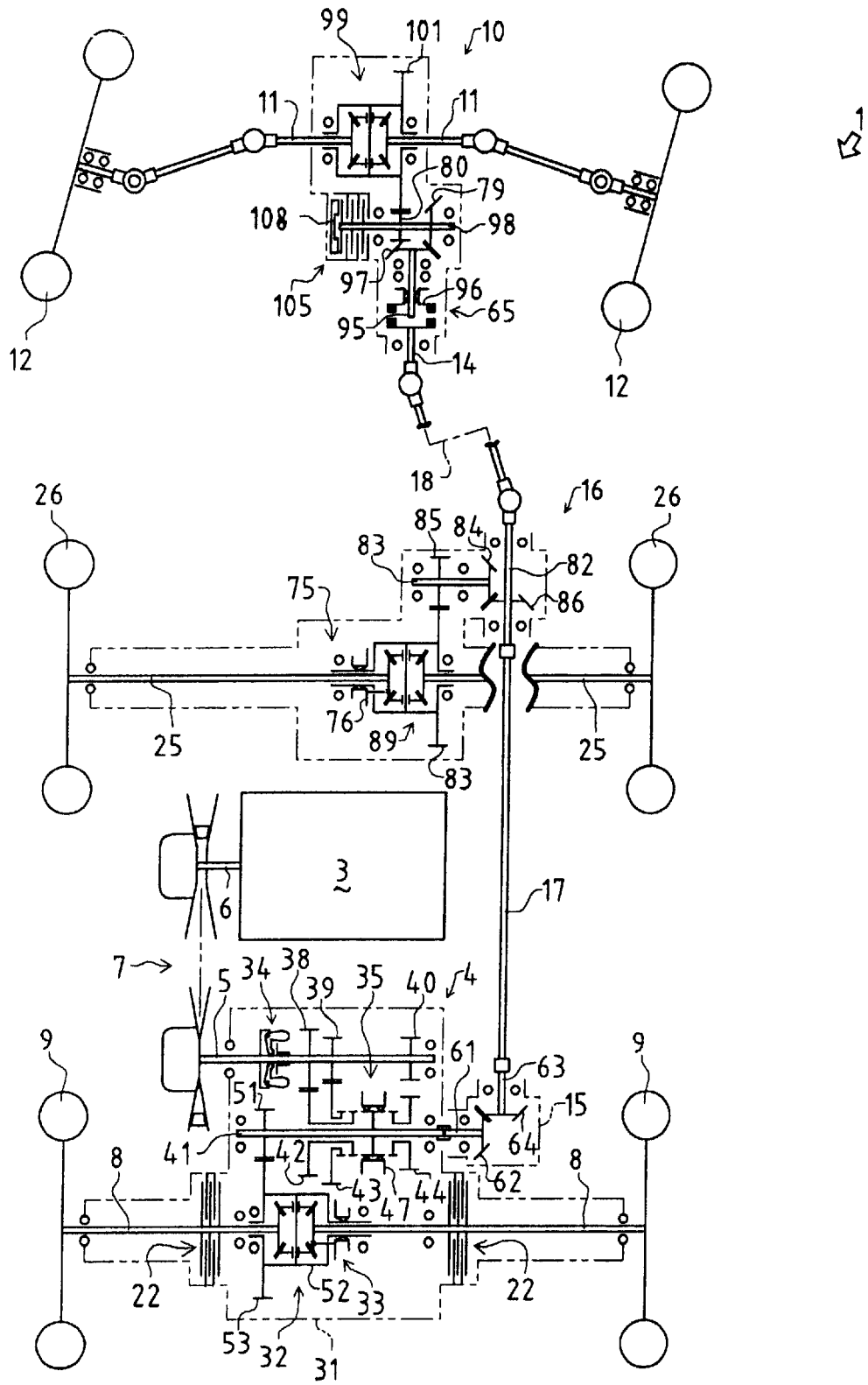
FIG. 1 is a diagram of a power train of a multi-wheeled vehicle provided with a gear transmission having a gear retaining mechanism according to the present invention.

General description will be given of a vehicle power train provided with a constantly meshing gear transmission having a gear retaining mechanism of the present invention in accordance with FIG. 1. A multi-wheeled (in this embodiment, six wheeled) vehicle 1 is equipped at a front portion thereof with a front transaxle apparatus 10, at a longitudinally intermediate portion thereof with a mid transaxle apparatus 16, and at a rear portion thereof with a rear transaxle apparatus 4. Front transaxle apparatus 10 supports a pair of left and right front axles 11, with respective front wheels 12 disposed at outer ends thereof. Mid transaxle apparatus 16 supports a pair of left and right middle axles 25, with respective middle wheels 26 disposed at outer ends thereof. Rear transaxle apparatus 4 supports a pair of left and right rear axles 8, with respective rear wheels 9 disposed at outer ends thereof. Left and right front wheels 12 are steerable, and an optimal steering manipulator is disposed on vehicle 1 so as to steer front wheels 12.

An engine 3 serving as a prime mover is mounted on vehicle 1 so as to orient an output shaft 6 thereof horizontally. Power of engine 3 is transmitted to rear axles 8 through a transmission (which includes a constantly meshing gear transmission regarding the invention) in rear transaxle apparatus 4, and also to middle axles 25 of mid transaxle apparatus 16, thereby driving rear wheels 9 and middle wheels 26. Thus, vehicle 1 travels by four-wheel drive. Front wheels 12 may be selectively driven in addition to rear and middle wheels 9 and 26. Namely, vehicle 1 may selectively travel by six-wheel drive.

Description will now be given of rear transaxle apparatus 4 in accordance with FIGS. 1 and 2. Rear transaxle apparatus 4 contains a transmission together with rear axles 8. An input shaft 5 of the transmission is drivingly connected with output shaft 6 of engine 3 through a CVT 7. According to the present embodiment, CVT 7 is a belt type transmission which comprises a split pulley and a belt. In this regard, a variable diameter driven pulley 36 serving as a part of CVT 7 is provided on input shaft 5 outside a housing 31 of rear transaxle apparatus 4. Alternatively, CVT 7 may be a hydrostatic transmission. The only requirement for CVT 7 is to reduce the deceleration ratio automatically continuously according to an increase of output rotary speed of engine 3 (i.e., the rotary speed of output shaft 6).

Housing 31 consists of left and right housing halves joined to each other. Housing 31 contains the transmission of rear transaxle apparatus 4, including left and right rear axles 8, a differential gearing 32, a differential locking mechanism 33, a centrifugal governor 34, and a sub speed change gearing 35. Differential gearing 32 connects both rear axles 8 to each other differentially. Differential locking mechanism 33 locks differential gearing 32 so as to integrate both rear axles 8 with each other. Sub speed change gearing 35, which serves as a constantly meshing gear transmission having the gear retaining mechanism of the present invention, changes the speed and direction of output rotation transmitted to differential gearing 32 by manipulating a sub speed changing manipulator so as to decide the rotary speed and direction of rear axles 8 in cooperation with CVT 7. A PTO casing 15 is provided on a side of housing 31 so as to incorporate a PTO gearing for transmitting power to mid transaxle apparatus 16 and front transaxle apparatus 10.

Input shaft 5 of rear transaxle apparatus 4 is extended laterally of vehicle 1. As mentioned above, one end of input shaft 5 projects outward from one lateral side of housing 31 so as to be provided thereon with variable diameter driven pulley 36 serving as a part of CVT 7 for inputting engine power. Variable diameter driven pulley 36 comprises a fixed pulley half fixed onto input shaft 5 and a movable pulley half axially slidably provided on input shaft 5.

Centrifugal governor 34 is interlockingly connected to input shaft 5 within housing 31 so as to change the amount of fuel injected to engine 3 based on the detection of the rotary speed of input shaft 5, thereby regulating the output rotary speed of engine 3. Centrifugal governor 34 includes a governor weight 71 and a lifter 72, which are provided around input shaft 5, a rotary shaft 74 that is rotatably supported by an upper wall of housing 31, a governor fork 73 that is interposed between lifter 72 and rotary shaft 74, and a link (not shown) that is interposed between rotary shaft 74 and a throttle valve of engine 3. Governor weight 71 is opened centrifugally by an increase of rotary speed of input shaft 5 so as to push lifter 72 along input shaft 5. Governor fork 73 engages with lifter 72 and is fixed to rotary shaft 74.

For constituting sub speed changing gearing 35, a high speed gear 38 is fixed on input shaft 5, and a low speed gear 39 and a reverse gear 40 are integrally formed on input shaft 5. A transmission shaft 41 is disposed parallel to input shaft 5. A high speed driven gear 42 and a reverse driven gear 44 are relatively rotatably provided on transmission shaft 41, and a low speed driven gear 43 is relatively rotatably provided on a boss (a boss 42a, see FIG. 5) of high speed driven gear 42. High speed driven gear 42 meshes with high speed gear 38 constantly, and low speed driven gear 43 engages with low speed gear 39 constantly, thereby constituting a high speed gear train and a low speed gear train in sub speed changing gearing 35 for forward traveling of vehicle 1. An idling gear 45 is freely rotatably provided in housing 31 so as to mesh with both reverse driven gear 44 and reverse gear 40 constantly, thereby constituting a reversing gear train in sub speed changing gearing 35 for backward traveling of vehicle 1.

For equipping sub speed changing gearing 35 with a clutch mechanism for gear change, a splined hub 46 is fixed on transmission shaft 41 between low speed driven gear 43 and reverse driven gear 44, and a clutch slider 47 is not-relatively rotatably but axially slidably provided on splined hub 46. Clutch slider 47 slides along transmission shaft 41 so as to engage selectively with one of driven gears 42, 43, and 44, thereby transmitting rotation of input shaft 5 to transmission shaft 41 through either high speed gear train for high speed forward traveling, the low speed gear train for low speed forward traveling, or the reversing gear train for backward traveling. Additionally, clutch slider 47 is selectively separated from all driven gears 42, 43, and 44 but engages with splined hub 46 so as to stop transmission shaft 41 (i.e., to put sub speed changing gearing 35 into neutral).

A fork (not shown) is fixed to an axially movable fork shaft (not shown) and engages with clutch slider 47. The fork shaft is interlockingly connected to a sub speed changing manipulator (not shown) on vehicle 1 outside housing 31. Due to this structure, by manipulating the sub speed changing manipulator, clutch slider 47 slides along transmission shaft 41 to select a low speed forward traveling position, a high speed forward traveling position, a backward traveling position, or a neutral position, thereby putting sub speed changing gearing 35 into the corresponding mode. Clutch slider 47 is held at the selected position because the fork shaft is equipped with a detent mechanism.

Transmission shaft 41 is notched on an outer periphery thereof toward one end thereof so as to form an output gear 51 for transmitting the rotation of transmission shaft 41 to differential gearing 32.

Differential gearing 32 has a typical construction. In this regard, rear axles 8 are disposed coaxially in housing 31 and inserted into a differential casing 52 so that proximal ends of rear axles 8 face each other in differential casing 52. A ring gear 53 is fixed on an outer periphery of differential casing 52 and meshes with output gear 51 constantly. A pinion shaft 54 is disposed perpendicularly to rear axles 8 so as to be rotatable together with differential casing 52 around the extended axis of rear axles 8. A bevel pinion 55 is disposed on pinion shaft 54 so as to be rotatable relatively to differential casing 52. A bevel differential side gear 56 is fixed onto the proximal end of each rear axle 8 and meshes with pinion 55 in differential casing 52, thereby differentially connecting rear axles 8 to each other.

Differential locking mechanism 33 for locking differential gearing 32 comprises a differential locking slider 57, a locking pin 58, and one differential side gear 56 formed therein with a recess 59. Differential locking slider 57 is axially slidably provided on a boss portion of differential casing 52 extended along one rear axle 8 oppositely to ring gear 53 fixed on differential casing 52. Locking pin 58 is fixed to differential locking slider 57 and projects at a tip thereof into differential casing 52. The tip of locking pin 58 fits into recess 59 formed in a distal end surface of correspondent one of differential side gears 56. A fork 81 engages with differential locking slider 57 and is operatively connected to a differential locking manipulator (not shown) disposed on vehicle 1 outside housing 31. By manipulating the differential locking manipulator, differential locking slider 57 slides on the boss of differential casing 52 so as to insert locking pin 58 into recess 59 selectively, thereby integrating rear axles 8 with each other. In other words, differential gearing 32 is locked so as to rotate left and right rear axles 8 at the same speed and direction. For unlocking differential gearing 32, the differential locking manipulator is manipulated oppositely to release locking pin 58 from recess 59.

A pair of frictional disk brakes 22 are provided on respective rear axles 8 and are operatively connected to a braking manipulator such as a brake pedal disposed on vehicle 1 outside housing 31. Referring to each brake 22, first friction disks 65 are not-relatively rotatably fitted onto each rear axle 8, and second friction disks 66 to housing 31, so that first friction disks 65 and second friction disks 66 are aligned alternately. A pressure member 67 is relatively rotatably and axially slidably disposed on each rear axle 8 adjacently to the most distal one of first and second friction disks 65 and 66.

A horizontal brake control shaft 68 is rotatably supported by a sidewall of housing 31. In housing 31, brake control shaft 68 interlocks with pressure members 67 through a cam (not shown) so that pressure member 67 is rotated according to rotation of brake control shaft 68. A distal end of brake control shaft 68 projects outward from housing 31 so as to be fixedly provided thereon with a brake control arm 69, which is operatively connected to the braking manipulator. In housing 31, a ball cam 70 is interposed between each pressure member 67 and a wall of housing 31 so as to thrust pressure member 67 toward first and second friction disks 65 and 66. When the braking manipulator is manipulated for braking so as to rotate brake control shaft 68 and pressure members 67, each pressure member 67 is thrust along rear axle 8 toward first and second friction disks 65 and 66 by actuation of cam 70 based on the rotation of pressure member 67 itself so as to press all correspondent friction disks 65 and 66 against one another, thereby braking correspondent rear axle 8.

In housing 31, a PTO shaft 61 is disposed laterally of vehicle 1 and coaxially to transmission shaft 41, and is integrally connected to transmission shaft 41 through a coupling 60. PTO shaft 61 projects laterally outward from either the left or right side of housing 31 into PTO casing 15 which is mounted convexly onto the side surface of housing 31. In PTO casing 15, a bevel gear 62 is fixed on the tip of PTO shaft 61. An output shaft 63 is disposed longitudinally of vehicle 1 (perpendicularly to PTO shaft 61) in PTO casing 15. A bevel gear 64 is fixed on output shaft 63 in PTO casing 15 and meshed with bevel gear 62. Output shaft 63 projects forward from PTO casing 15 so as to be drivingly connected to a middle drive shaft 82 through a propeller shaft 17.

Figure 3:
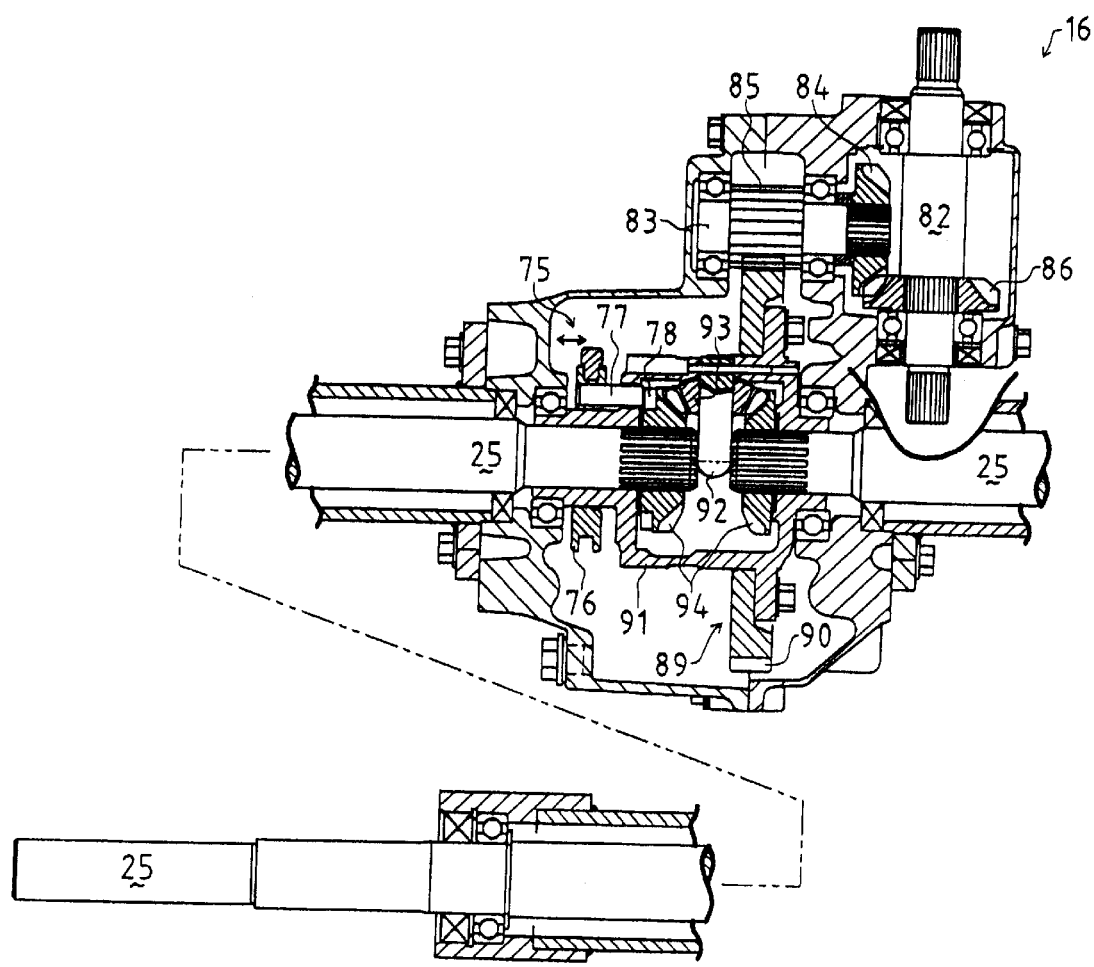
FIG. 3 is a developed sectional plan view of a mid transaxle apparatus in the power train shown in FIG. 1.

Description will now be given of mid transaxle apparatus 16 in accordance with FIGS. 1 and 3. Middle drive shaft 82, serving as an input shaft of mid transaxle apparatus 16, projects backward from mid transaxle apparatus 16 so as to receive power from rear transaxle apparatus 4 through propeller shaft 17. Middle drive shaft 82 is disposed laterally eccentrically so as to locate propeller shaft 17 across one of middle axles 25, thereby ensuring a free space for arrangement of the laterally middle main portion of mid transaxle apparatus 16.

A bevel gear 86 is fixed onto middle drive shaft 82. A counter shaft 83 is disposed laterally horizontally perpendicular to middle drive shaft 82. A bevel gear 84 is fixed onto one end portion of counter shaft 83 and meshes with bevel gear 86. A counter output shaft 85 is fixed onto the other end portion of counter shaft 83 and meshes with a ring gear 90 of a differential gearing 89 which differentially connects middle axles 25 to each other.

Differential gearing 89 has a typical construction. Proximal end portions of coaxial middle axles 25 are relatively rotatably inserted into a differential casing 91 so as to face each other. Ring gear 90 is fixed on the outer periphery of differential casing 91 and meshes with counter output gear 85 supported in mid transaxle apparatus 16. A pinion shaft 92 is disposed in differential casing 91 perpendicularly to middle axles 25 so as to be rotatable together with differential casing 91 around the extended axis of middle axles 25, and a pair of bevel differential side gears 94 are fixed onto respective proximal end portions of middle axles 25 in differential casing 91. Bevel pinion 93 is disposed on pinion shaft 92 so as to be rotatable relatively to differential casing 91. Pinion 93 meshes with both side gears 94.

Differential gearing 89 is provided with a differential locking mechanism 75 having the following structure. A differential locking slider 76 is axially slidably provided on a boss of differential casing 91 formed laterally oppositely to ring gear 90. A lock pin 77 is fixed to differential locking slider 76 and inserted into differential casing 91. One side gear 94 is formed in an outer side surface thereof with a recess 78 into which lock pin 77 is allowed to fit so as to integrate both middle axles 25 with each other.

Differential locking mechanism 75 is interlockingly connected to differential locking mechanism 33 of rear transaxle apparatus 4 so that both differential gearings 32 and 89 are locked simultaneously, and unlocked simultaneously.

Middle drive shaft 82 also serves as a PTO shaft for driving front transaxle apparatus 10 and projects forward from mid transaxle apparatus 16 so as to be drivingly connected through a propeller shaft 18 to a front input shaft 14 serving as an input shaft of front transaxle apparatus 10.

Figure 4:
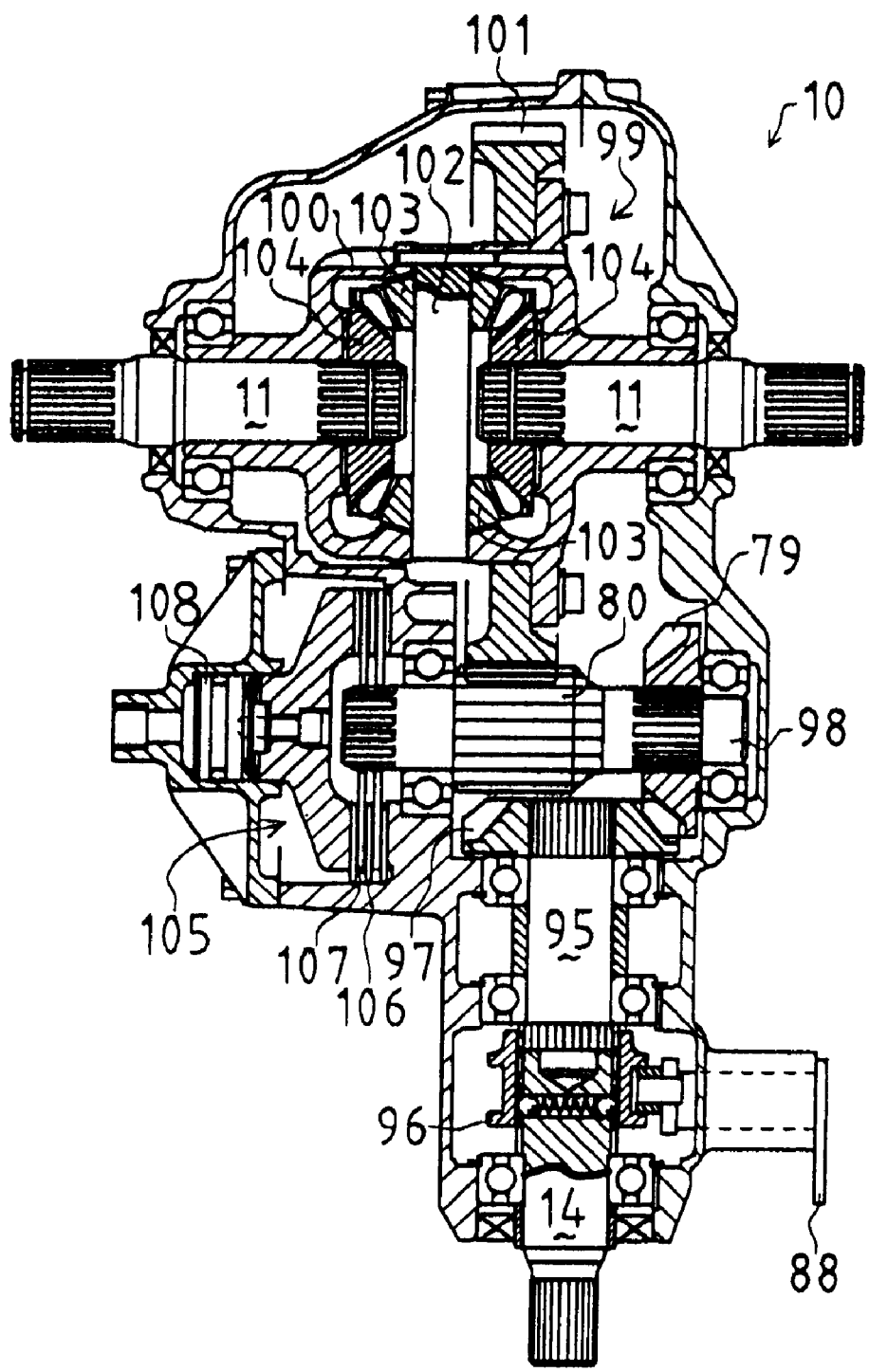
FIG. 4 is a developed sectional plan view of a front transaxle apparatus in the power train shown in FIG. 1.

Description will now be given of front transaxle apparatus 10 in accordance with FIGS. 1 and 4. Front transaxle apparatus 10 supports front input shaft 14 in the longitudinal direction of vehicle 1. Front input shaft 14 projects backward so as to be drivingly connected to middle drive shaft 82 through propeller shaft 18 and universal joints. In front transaxle apparatus 10 is disposed a clutch shaft 95 coaxially extended forward from front input shaft 14. A front clutch slider 96 is axially slidably provided on clutch shaft 95 so as to engage with or disengage from front input shaft 14, and is operatively connected to a lever 88 disposed on either the left or right side of front transaxle apparatus 10. Lever 88 is operatively connected to a driving mode switching manipulator provided on vehicle 1 through an optimal link.

A bevel gear 97 is fixed on clutch shaft 95. A counter shaft 98 is supported in front transaxle apparatus 10 perpendicularly to clutch shaft 95. A bevel gear 79 is fixed on counter shaft 98 and meshes with bevel gear 97.

An output gear 80 is formed on an axially intermediate periphery of counter shaft 98 and meshes with a ring gear 101 of a differential gearing 99 which differentially connects front axles 11 to each other. Differential gearing 99 is constructed substantially similarly with differential gearings 32 and 89 except that it has no differential locking mechanism. In this regard, a differential casing 100 is disposed in front transaxle apparatus 10, and proximal ends of coaxial front axles 11 are relatively rotatably inserted into differential casing 100 so as to face each other. Ring gear 101 is fixed on the outer periphery of differential casing 100 and meshes with output gear 80. In differential casing 100, a pinion shaft 102 is disposed perpendicularly to front axles 11 so as to rotate together with differential casing 100 around the extended axis of front axles 11, a pair of bevel pinions 103 are provided pinion shaft 102 symmetrically to each other so as to be rotatable relatively to differential casing 100, and a pair of bevel differential side gears 104 are fixed onto the respective proximal ends of front axles 11 so that each of side gears 104 meshes with both pinions 103.

A multi disk brake 105 is provided on counter shaft 98. In this regard, first friction disks 106 are not-relatively rotatably fitted onto counter shaft 98 and second friction disks 107 are disposed not-relatively rotatably to a housing of front transaxle apparatus 10 so that first and second friction disks 106 and 107 are aligned alternately. A hydraulically-operated piston 108 presses friction disks 106 and 107 against one another. The gaps among first and second friction disks 106 and 107 are automatically adjusted so that the stroke of piston 10 required to press friction disks 106 and 107 for braking counter shaft 98 is kept constant regardless of abrasion of friction disks 106 and 107.

A bevel gear having the same shape may serve as all bevel gears 62, 64, 84, 86, 79, and 97 in rear, mid, and front transaxle apparatuses 4, 16, and 10, thereby reducing expenses.

For the same purpose of reducing costs, a ring gear having the same shape may serve as each of ring gears 53, 90, and 101 of differential gears 32, 89, and 99 in rear, mid, and front transaxle apparatuses 4, 16, and 10. Each of the ring gears 53, 90, and 101 may be a spur gear so as to mesh with a spur gear serving as each of output gears 51, 85, and 80. Mutually meshing spur gears are advantageous in that the adjustment of backlash thereof may not be strict, noise generating therefrom may be reduced and the strength thereof may be increased, in comparison with mutually meshing bevel gears.

Description will now be given of a gear retaining mechanism applied to sub speed changing gearing 35 of rear transaxle apparatus 4 according to a first embodiment as shown in FIGS. 5 to 9. Arrows drawn in FIGS. 5(b), 6, 7(b), 8(b), and 9(b) are oriented in the actual rotational directions of correspondent hub and gears 46, 42, 43, and 44.

Figure 2:
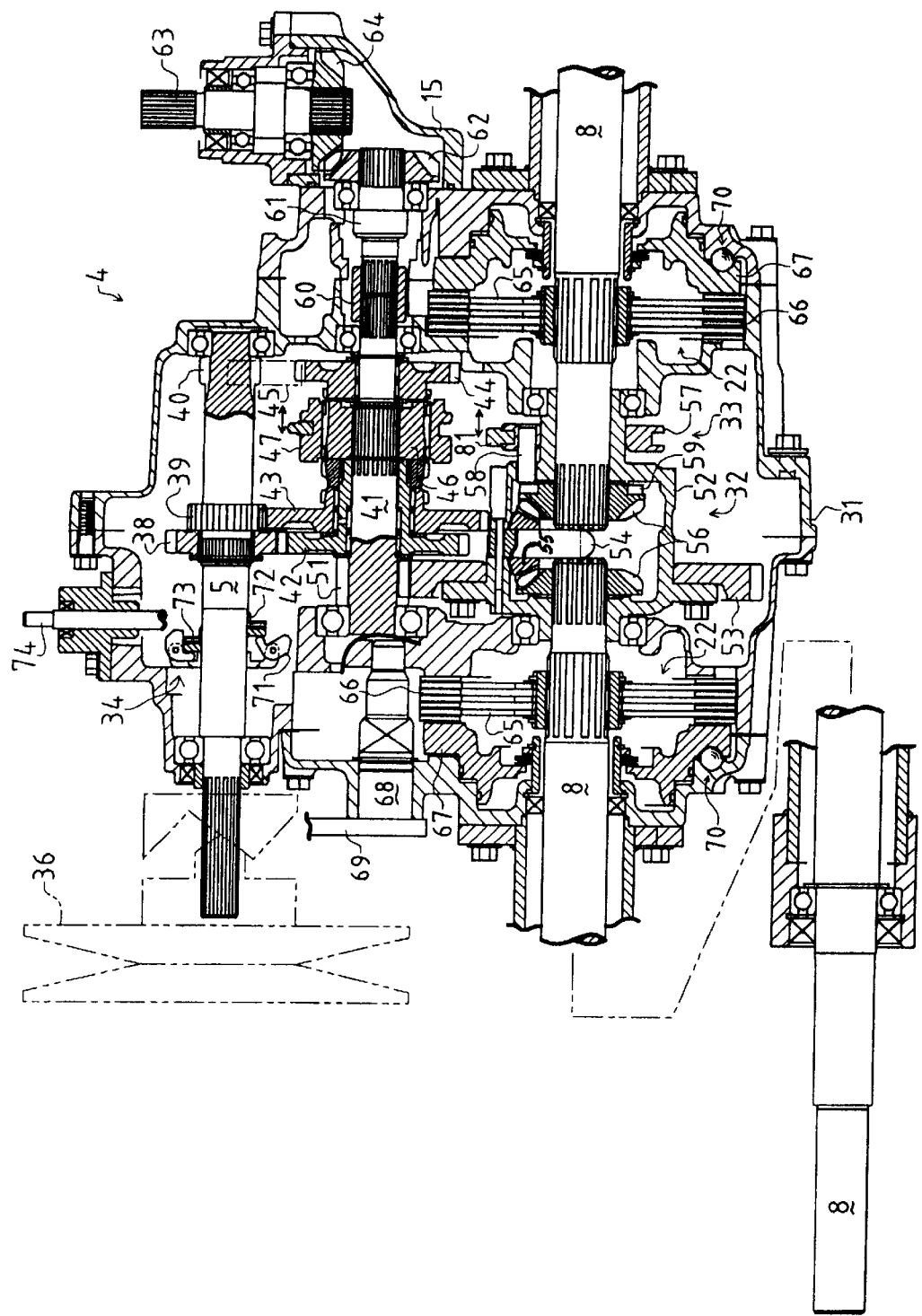
FIG. 2 is a developed sectional rear view of a rear transaxle apparatus in the power train shown in FIG. 1.

Referring to FIG. 5(a) serving as an enlarged view of the principal portion of rear transaxle apparatus 4 of FIG. 2, splined hub 46 fixed on transmission shaft 41 is provided on the outer periphery with male splines 46x. Clutch slider 47 is provided on the inner periphery thereof with female splines 47y. Clutch slider 47 is provided on one inner peripheral end portion thereof with first teeth 111, and, on the other inner peripheral end portion thereof with second teeth 112. First tooth 111 and second tooth 112 are aligned in a line along the axis of transmission shaft 41 so as to constitute each of female splines 47y. An optimally axial gap is secured between first tooth 111 and second tooth 112 in each female spline 47y.

Figure 5:
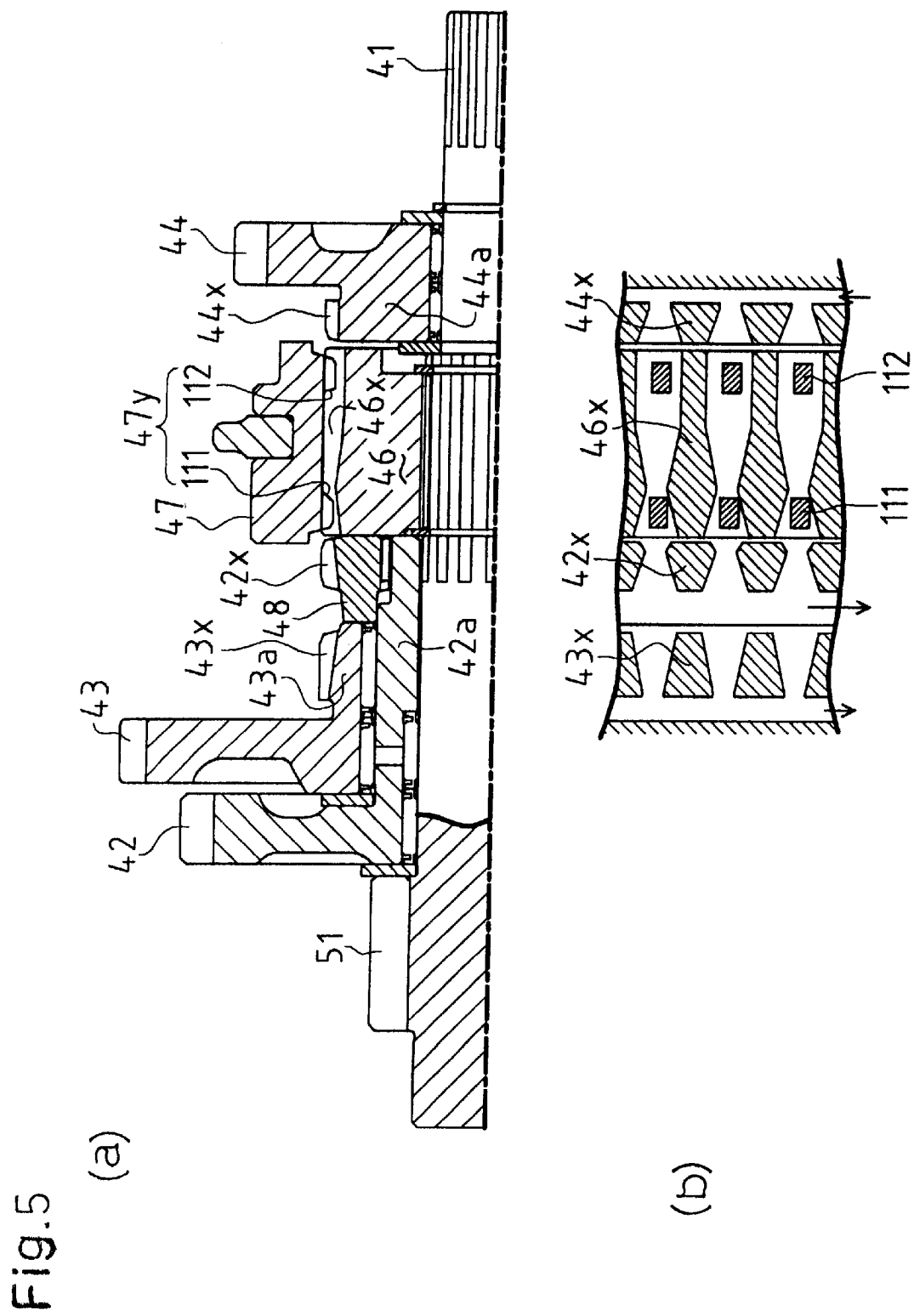
FIG. 5(a) is a fragmentary sectional rear view of a first embodiment of a constantly meshing gear transmission in the rear transaxle apparatus set in a neutral mode, and (b) is a fragmentary sectional plan view of the same.
Figure 6:
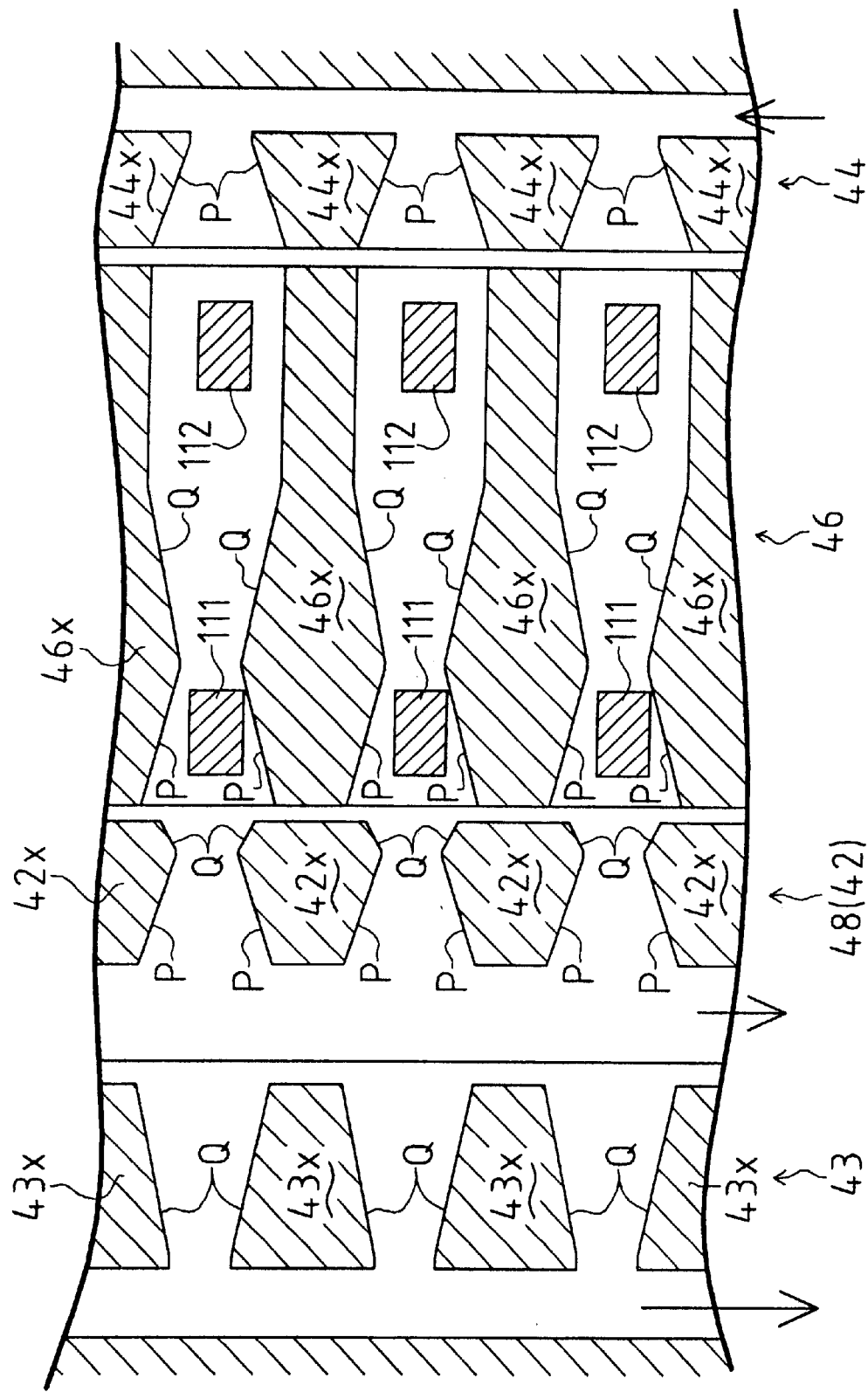
FIG. 6 is an enlarged fragmentary sectional plan view of the same constantly meshing gear transmission set in the neutral mode.

Female splines 47y mesh with male splines 46x of hub 46 so as to make clutch slider 47 axially slidable. When sub speed changing gearing 35 is set in neutral, all first and second teeth 111 and 112 are disposed among male splines 46x of splined hub 46 freely from any of later-discussed male splines 42x, 43x and 44x, as shown in FIGS. 5 and 6.

High speed driven gear 42 relatively rotatably provided on transmission shaft 41 extends a boss 42a axially toward splined hub 46. A splined hub 48 is not-relatively rotatably disposed on an end portion of boss 42a adjacent to splined hub 46. Splined hub 48 is provided on the outer periphery thereof with male splines 42x allowed to engage or disengage with and from female splines 47y of clutch slider 47. For convenience, male splines 42x of splined hub 48 will be named male splines 42x of high speed driven gear 42.

Low speed driven gear 43 is relatively rotatably provided on boss 42a of high speed driven gear 42 and extends a boss 43a along boss 42a close to splined hub 48. Male splines 43x are formed on the outer periphery of boss 43a so as to engage with or disengage from female splines 47y of clutch slider 47.

Consequently, on one axial side of splined hub 46 are disposed male splines 42x of high speed driven gear 42 and male splines 43x of low speed driven gear 43 so that male splines 42x are nearer to splined hub 46 than male splines 43x.

On the other axial side of splined hub 46 is disposed reverse driven gear 44 which is relatively rotatably fitted on transmission shaft 41. Reverse driven gear 44 extends a boss 44a axially close to splined hub 46. Boss 44a is provided on the outer periphery thereof with male splines 44x allowed to engage with or disengage from female splines 47y of clutch slider 47. Thus, as shown in FIGS. 5(b) and 6, male splines 46x, 42x, 43x and 44x are continuously aligned one after another along the axis of transmission shaft 41.

In order to retain each of hub and gears 46, 42, 43, and 44 selectively meshing with clutch slider 47 without escaping, male splines 46x, 42x, 43x, and 44x are shaped as shown in FIG. 6. Each of male splines 46x, 42x, 43x, and 44x is tapered. A reference numeral P designates a tapered portion narrowed toward one axial end (in FIG. 6, a left end) of transmission shaft 41, and a reference numeral Q designates a tapered portion narrowed opposite to tapered portion P. An end portion (in FIG. 6, a left end portion) of each male spline 46x of splined hub 46 adjacent to male spline 42x serves as tapered portion P. Each male spline 46x also comprises tapered portion Q continuing to tapered portion P of male spline 46x. An end portion (in FIG. 6, a right end portion) of each male spline 42x of high speed driven gear 42 adjacent to tapered end portion P of male spline 46x serves as tapered portion Q. The remaining portion (in FIG. 6, a left portion) of each male spline 42x serves as tapered portion P continuing to tapered portion Q of male spline 42x. Each male spline 43x of low speed driven gear 43 is tapered in the substantially whole axial direction thereof so as to serve as tapered portion Q. Each male spline 44x of reverse driven gear 44 is tapered in the substantially whole axial direction thereof so as to serve as tapered portion P.

Figure 7:
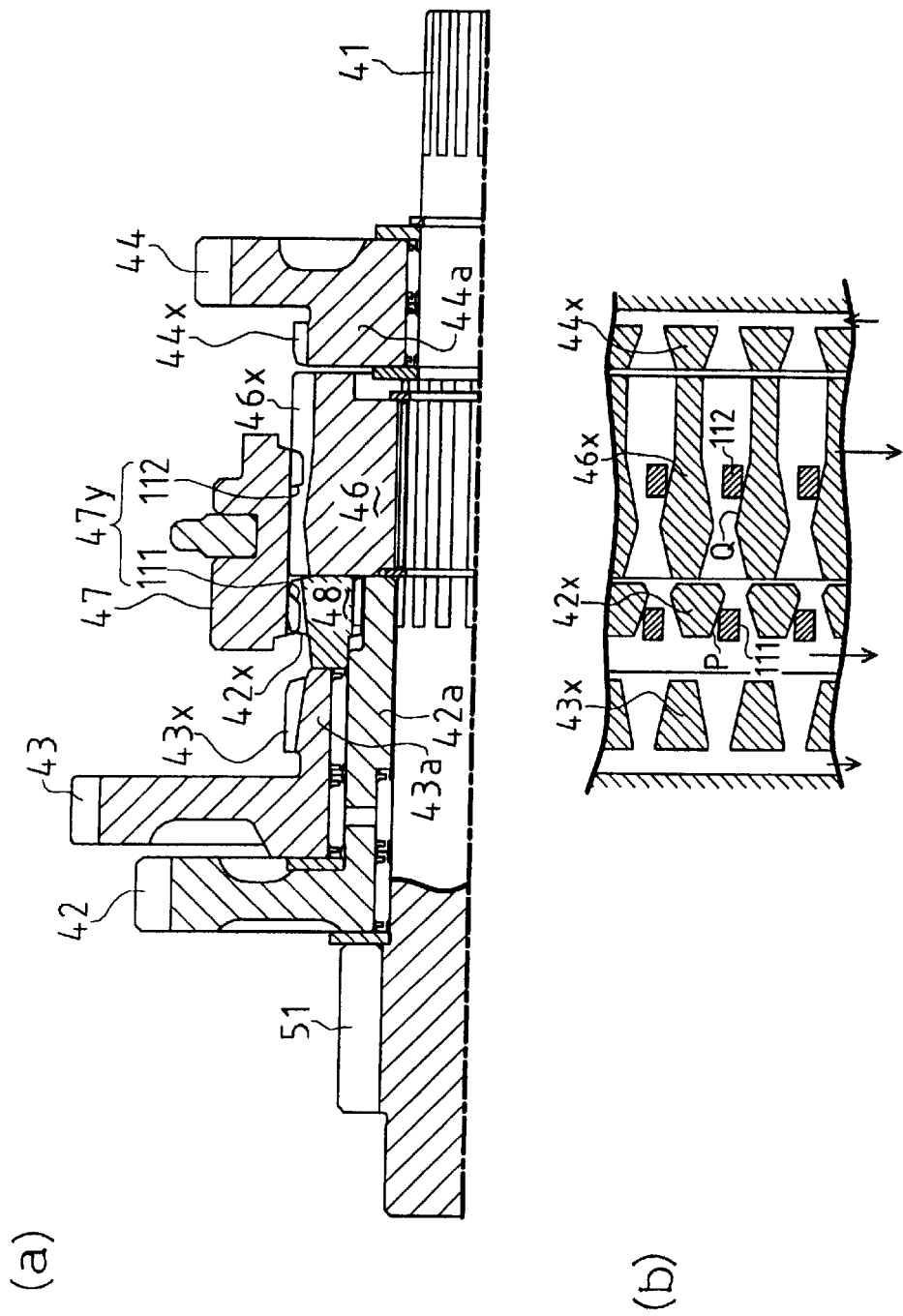
FIG. 7(a) is a fragmentary sectional rear view of the same constantly meshing gear transmission set in a high speed forward traveling mode, and (b) is a fragmentary sectional plan view of the same.

For setting sub speed changing gearing 35 in the high speed forward traveling mode, as shown in FIG. 7, clutch slider 47 is located so as to put first teeth 111 among male splines 42x of high speed driven gear 42 while second teeth 112 are still disposed among male splines 46x of splined hub 46, whereby clutch slider 47 fixedly connects high speed driven gear 42 to transmission shaft 41 through splined hub 46.

As shown in FIG. 7(b), first teeth 111 abut against respective tapered portions P of male splines 42x while second teeth 112 abut against respective tapered portions Q of male splines 46x. As understood from the arrow of high speed driven gear 42 in FIG. 7(b), high speed driven gear 42 meshing with high speed gear 38 is rotated so as to press tapered portions P of male splines 42x against first teeth 111, thereby forcing first teeth 111 toward male splines 43x of low speed driven gear 43 (in FIG. 7(b), leftward). On the other hand, splined hub 46 fixed on transmission shaft 41, to which the ground load applied on rear wheels 9 is transmitted, tends to resist the rotation of clutch slider 47 engaging with high speed driven gear 42 so as to press taper portions Q of male splines 46x against second teeth 112, thereby forcing second teeth 112 toward male splines 44x of reverse driven gear 44 (in FIG. 7(b), rightward).

Consequently, while vehicle 1 travels in the high speed forward traveling mode, first teeth 111 and second teeth 112 are forced oppositely to each other in each female spline 47y. In other words, each of first and second teeth 111 and 112 is hard to move toward the wider end of correspondent tapered portion P or Q abutting against it because it requires a great deal of force to move in such a way. The force is equal to the normal operation force for shifting clutch slider 47, and is more than a force naturally generated in normally rotating clutch slider 47 onto which a differential force generated between input shaft 5 and transmission shaft 41 is applied. The same is true in the following cases where sub speed changing gearing 35 is set in the low speed forward traveling mode or the backward traveling mode.

Thus, when sub speed gearing 35 is set in the high speed forward traveling mode, clutch slider 47 is retained stably between splined hub 46 and high speed driven gear 42 so that high speed driven gear 42 is fixed to transmission shaft 41.

Figure 8:
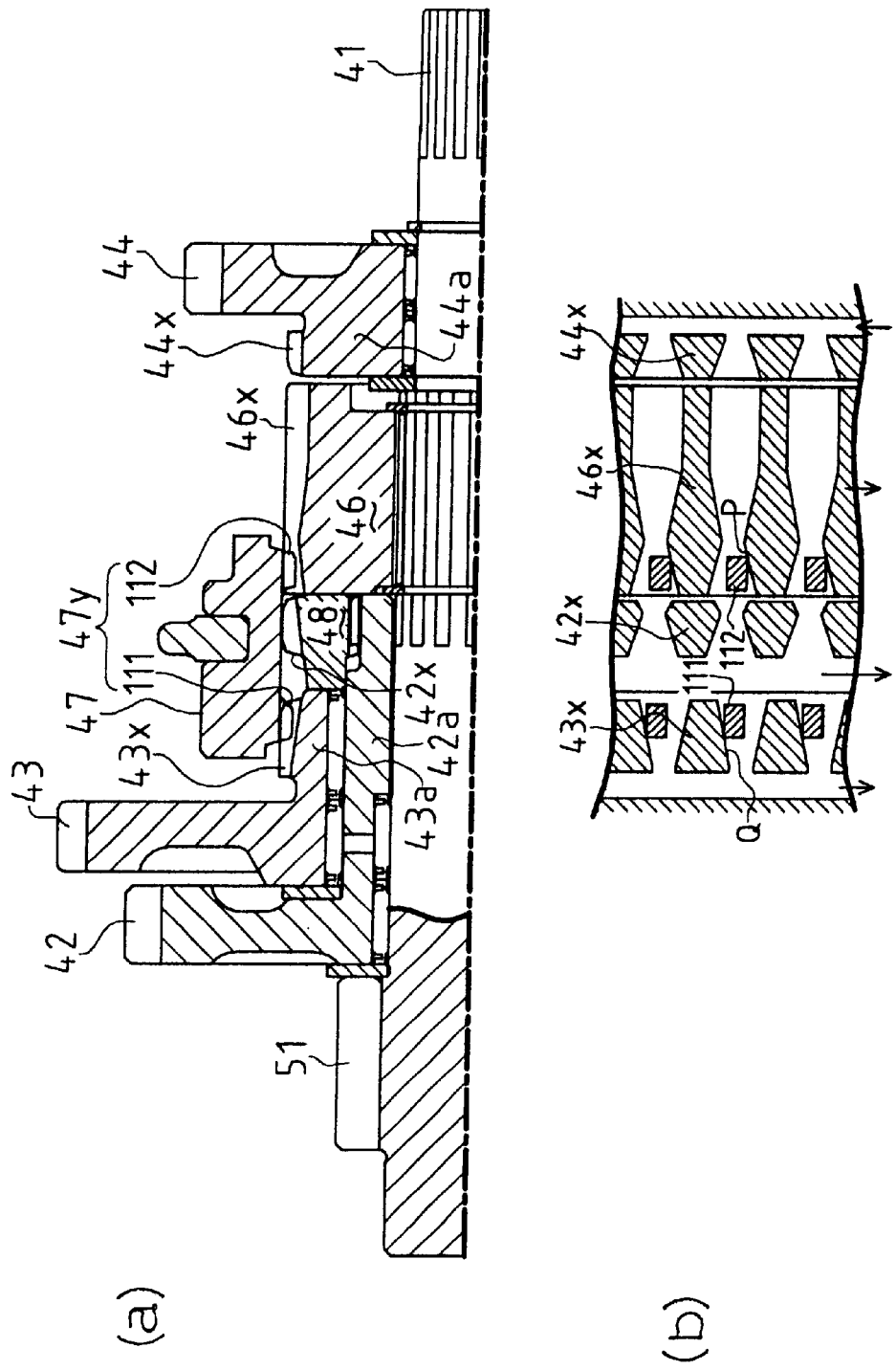
FIG. 8(a) is a fragmentary sectional rear view of the same constantly meshing gear transmission set in a low speed forward traveling mode, and (b) is a fragmentary sectional plan view of the same.

For setting sub speed changing gearing 35 in the low speed forward traveling mode, as shown in FIG. 8, clutch slider 47 is located so as to put first teeth 111 among male splines 43x of low speed driven gear 43 while second teeth 112 are still disposed among male splines 46x of splined hub 46, whereby clutch slider 47 fixedly connects low speed driven gear 43 to transmission shaft 41 through splined hub 46. In this state, male splines 42x are allowed to pass through the gap between first teeth 111 and second teeth 112 according to free rotation of high speed driven gear 42 in relation to low speed driven gear 43.

As shown in FIG. 8(b), first teeth 111 abut against respective tapered portions Q of male splines 43x while second teeth 112 abut against respective tapered portions P of male splines 46x. As understood from the arrow of low speed driven gear 43 in FIG. 8(b), low speed driven gear 43, engaged with low speed gear 39, is rotated so as to press tapered portions Q of male splines 43x against first teeth 111, thereby forcing first teeth 111 toward male splines 42x of high speed driven gear 42 (in FIG. 8(b), rightward). On the other hand, splined hub 46 fixed on transmission shaft 41, to which the ground load applied on rear wheels 9 is transmitted, tends to resist the rotation of clutch slider 47 engaging with low speed driven gear 43 so as to press taper portions P of male splines 46x against second teeth 112, thereby forcing second teeth 112 toward male splines 42x of high speed driven gear 42 (in FIG. 8(b), leftward).

Consequently, while vehicle 1 travels in the low speed forward traveling mode, first teeth 111 and second teeth 112 are forced oppositely to each other in each female spline 47y so that clutch slider 47 is retained stably between splined hub 46 and low speed driven gear 43 so as to fix low speed driven gear 43 to transmission shaft 41.

Figure 9:
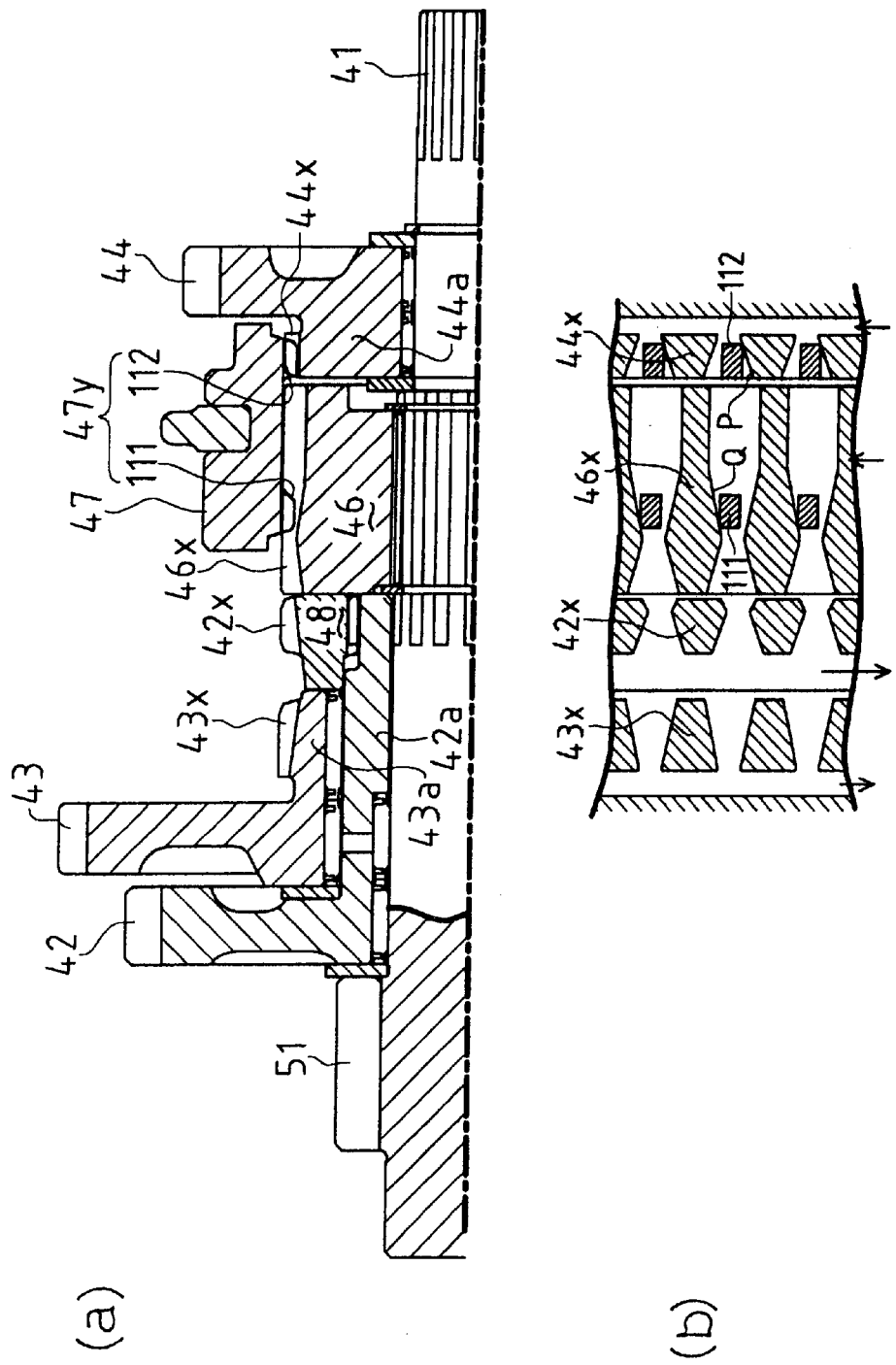
FIG. 9(a) is a fragmentary sectional rear view of the same constantly meshing gear transmission set in a backward traveling mode, and (b) is a fragmentary sectional plan view of the same.

For setting sub speed changing gearing 35 in the backward traveling mode, as shown in FIG. 9, clutch slider 47 is located so as to put second teeth 112 among male splines 44x of reverse driven gear 44 while first teeth 111 are still disposed among male splines 46x of splined hub 46, whereby clutch slider 47 fixedly connects reverse driven gear 44 to transmission shaft 41 through splined hub 46.

As shown in FIG. 9(b), first teeth 111 abut against respective tapered portions Q of male splines 46x while second teeth 112 abut against respective tapered portions P of male splines 44x. As understood from the arrow of reverse driven gear 44 in FIG. 9(b), reverse driven gear 44 engaging with reverse gear 40 through idling gear 45 is rotated so as to press tapered portions P of male splines 44x against second teeth 112, thereby forcing second teeth 112 toward male splines 46x of splined hub 46 (in FIG. 9(b), leftward). On the other hand, splined hub 46 fixed on transmission shaft 41, to which ground load applied on rear wheels 9 is transmitted, tends to resist the rotation of clutch slider 47 engaging with reverse driven gear 44 so as to press taper portions Q of male splines 46x against first teeth 111, thereby forcing first teeth 111 toward male splines 44x of reverse driven gear 44 (in FIG. 8(b), rightward).

Consequently, while vehicle 1 travels in the backward traveling mode, first teeth 111 and second teeth 112 are forced oppositely to each other in each female spline 47y so that clutch slider 47 is retained stably between splined hub 46 and reverse driven gear 44 so as to maintain reverse driven gear 44 fixed to transmission shaft 41.

Figure 10:
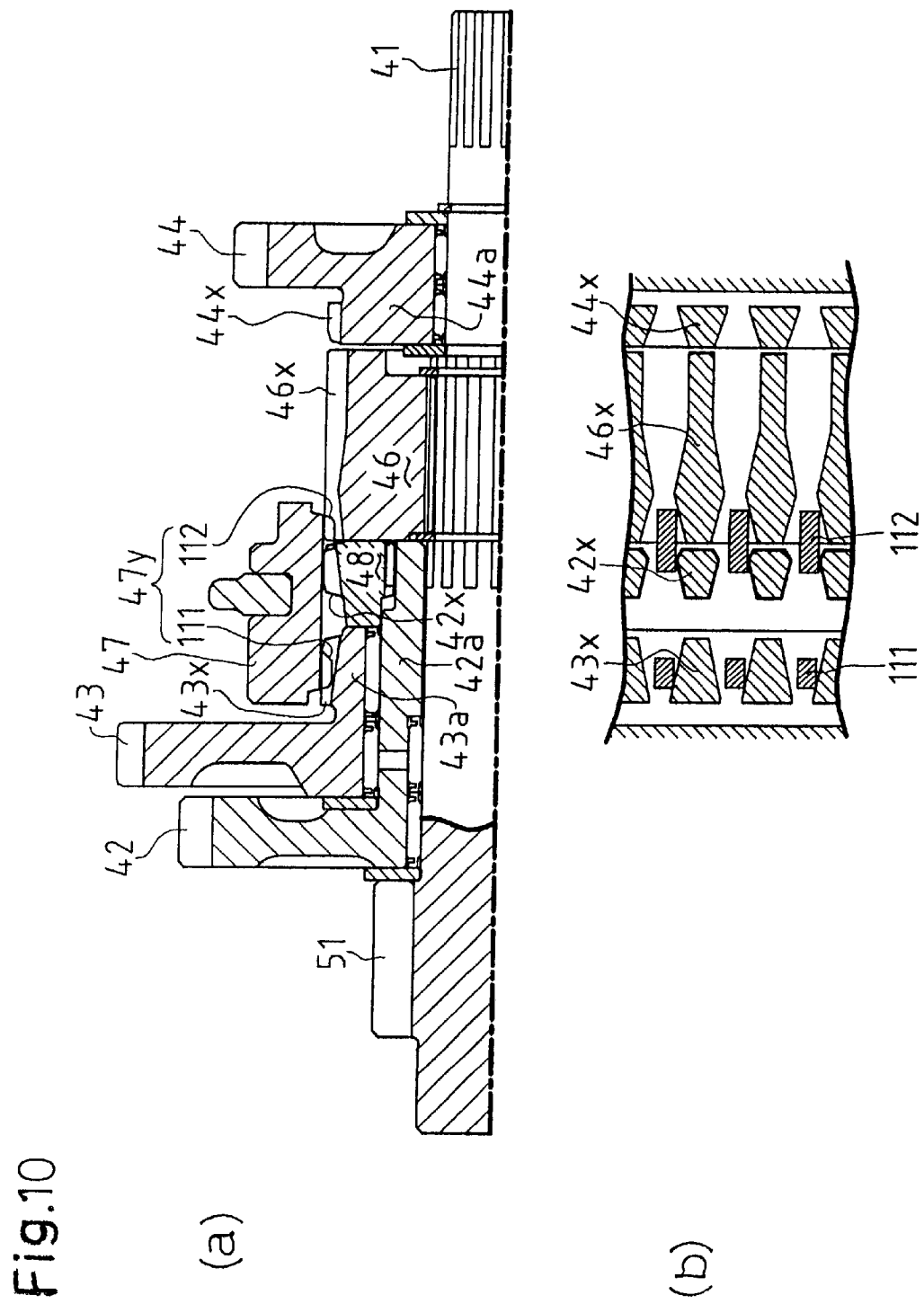
FIG. 10(a) is a fragmentary sectional rear view of a modified constantly meshing gear transmission set in a parking brake mode, and (b) is a fragmentary sectional plan view of the same.

Vehicle 1 may be equipped with a parking brake. Correspondingly, clutch slider 47 may be modified as shown in FIG. 10. In this regard, second teeth 112 are elongated along transmission shaft 41 so that second teeth 112 may be disposed across the border between male splines 46x and male splines 42x. For applying the parking brake, clutch slider 47 is located so that first teeth 111 abut against respective tapered male splines 43x of low speed driven gear 43 and that second teeth 112 are disposed across the border between male splines 46x and male splines 42x, that is, among male splines 46x and among male splines 42x. Thus, clutch slider 47 fixedly connects both high speed driven gear 42 and low speed driven gear 43 to transmission shaft 41 through splined hub 46, thereby locking transmission shaft 41 surely.

For setting sub speed changing gearing 35 in either the high speed forward traveling mode or the low speed forward traveling mode, clutch slider 47 is located so that first teeth 111 are put among either male splines 42x or male splines 43x while second teeth 112 are entirely disposed among only male splines 46x. For setting sub speed changing gearing 35 in the backward traveling mode, clutch slider 47 is located so that first teeth 111 are disposed among male splines 46x and second teeth 112 are disposed among male splines 44x. In this case, second teeth 112 may be disposed across the border between male splines 44x and male splines 46x.

Figure 11:
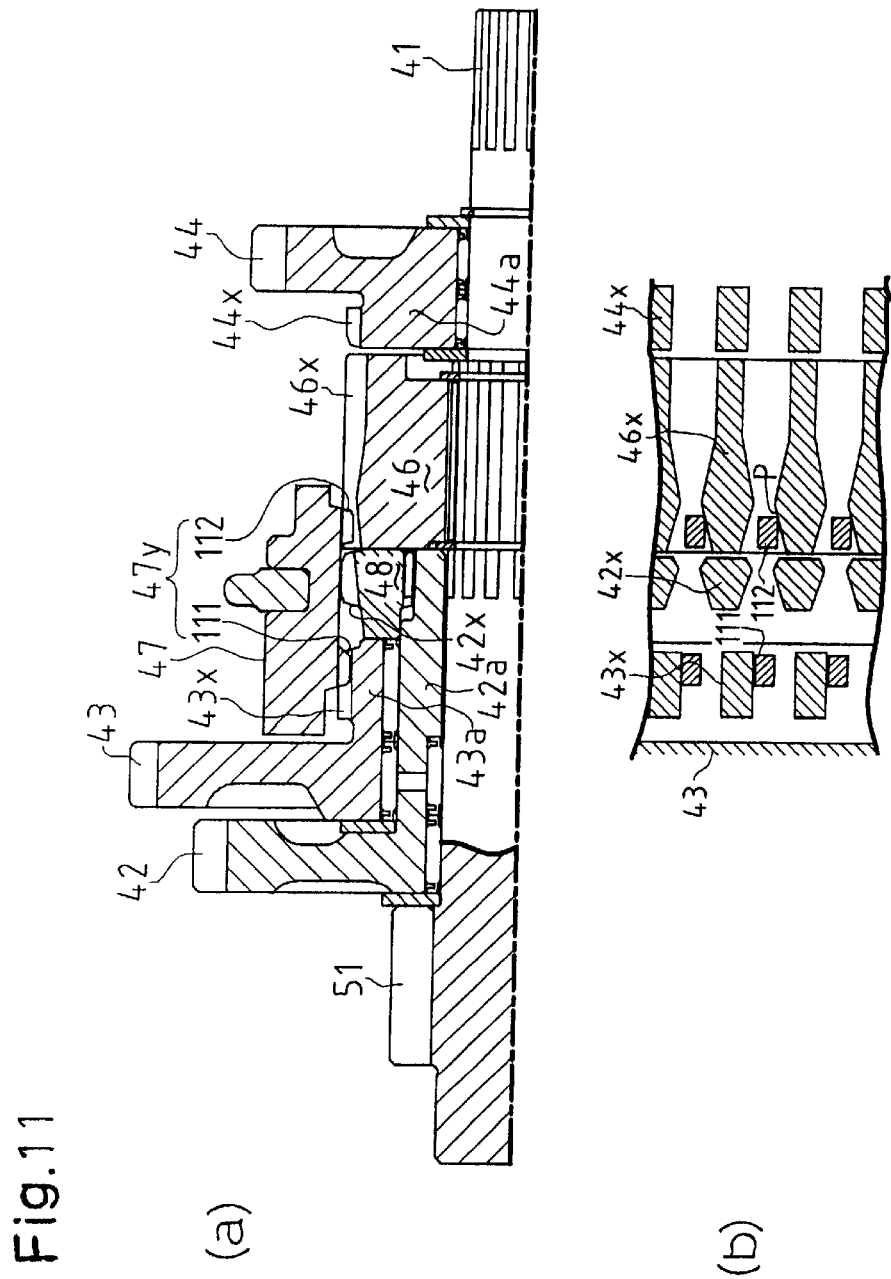
FIG. 11(a) is a fragmentary sectional rear view of a second embodiment of a constantly meshing gear transmission in the rear transaxle apparatus set in a low speed forward traveling mode, and (b) is a fragmentary sectional plan view of the same.
Figure 12:
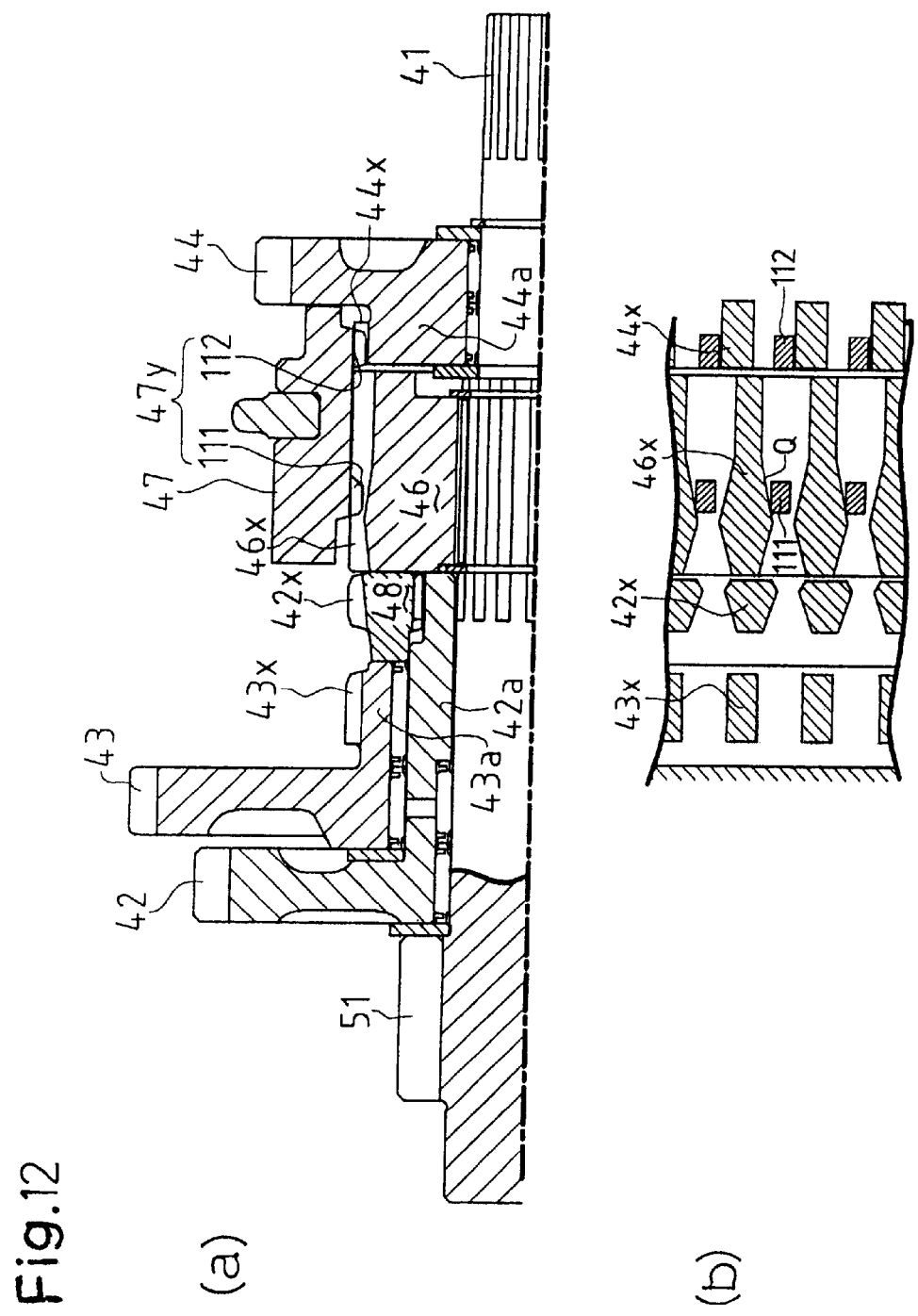
FIG. 12(a) is a fragmentary sectional rear view of the same constantly meshing gear transmission set in a backward traveling mode, and (b) is a fragmentary sectional plan view of the same.

Description will now be given of another gear retaining mechanism applied to sub speed changing gearing 35 of rear transaxle apparatus 4 according to a second embodiment as shown in FIGS. 11 and 12.

In this embodiment, male splines 43x of low speed driven gear 43 and male splines 44x of reverse driven gear 44 are not tapered, thereby reducing the manufacturing costs thereof. Both ends of clutch slider 47 are extended so as to project along transmission shaft 41 from respective first and second teeth 111 and 112.

As shown in FIGS. 11(a) and (b), when sub speed changing gearing 35 is set in the low speed forward traveling mode, first teeth 111 of clutch slider 47 are disposed among not-tapered male splines 43x of low speed driven gear 43 while second teeth 112 are pressed against respective tapered portions P of male splines 46x of splined hub 46 so as to be prevented from moving toward male splines 44x of reverse driven gear 44 (in FIG. 11, rightward). However, one end surface of clutch slider 47 projecting from first teeth 111 abuts against the side surface of low speed driven gear 43 so that clutch slider 47 is prevented from moving further toward high and low speed driven gears 42 and 43 (in FIG. 11, leftward). Thus, clutch slider 47 fitting low speed driven gear 43 and splined hub 46 is prevented from moving in both opposite directions along transmission shaft 41, thereby being retained stably.

As shown in FIGS. 12(a) and (b), when sub speed changing gearing 35 is set in the neutral mode, second teeth 112 of clutch slider 47 are disposed among not-tapered male splines 44x of reverse driven gear 43 while first teeth 111 are pressed against respective tapered portions Q of male splines 46x of splined hub 46 so as to be prevented from moving toward male splines 42x of high speed driven gear 42 (in FIG. 12, leftward). However, the other end surface of clutch slider 47 projecting from second teeth 112 abuts against the side surface of reverse driven gear 44 so that clutch slider 47 is prevented from moving further toward reverse driven gears 44 (in FIG. 12, rightward). Thus, clutch slider 47 fitting reverse driven gear 44 and splined, hub 46 is prevented from moving in both opposite directions along transmission shaft 41, thereby being retained stably.

The case where sub speed changing gearing 35 according to the second embodiment is set in the high speed forward traveling mode is not illustrated. However, in this case, similar to the case of FIG. 7, first teeth 111 abut against respective tapered portions P of male splines 42x and second teeth 112 abut against respective tapered portions Q of male splines 46x so that clutch slider 47 is prevented from moving in both opposite directions along transmission shaft 41.

Foregoing sub speed changing gearing 35 according to any of the first and second embodiments uses no spring for detent of gears, thereby reducing the number of parts and costs. Furthermore, the operation force for shifting clutch slider 47 is sufficient if the force can move first or second teeth 111 or 112 against respective tapered portions P or Q of male spline 46x, 42x, 43x, or 44x, whereby the force may be less than operation force for shifting the conventional clutch slider equipped with detent springs.

Figure 13:
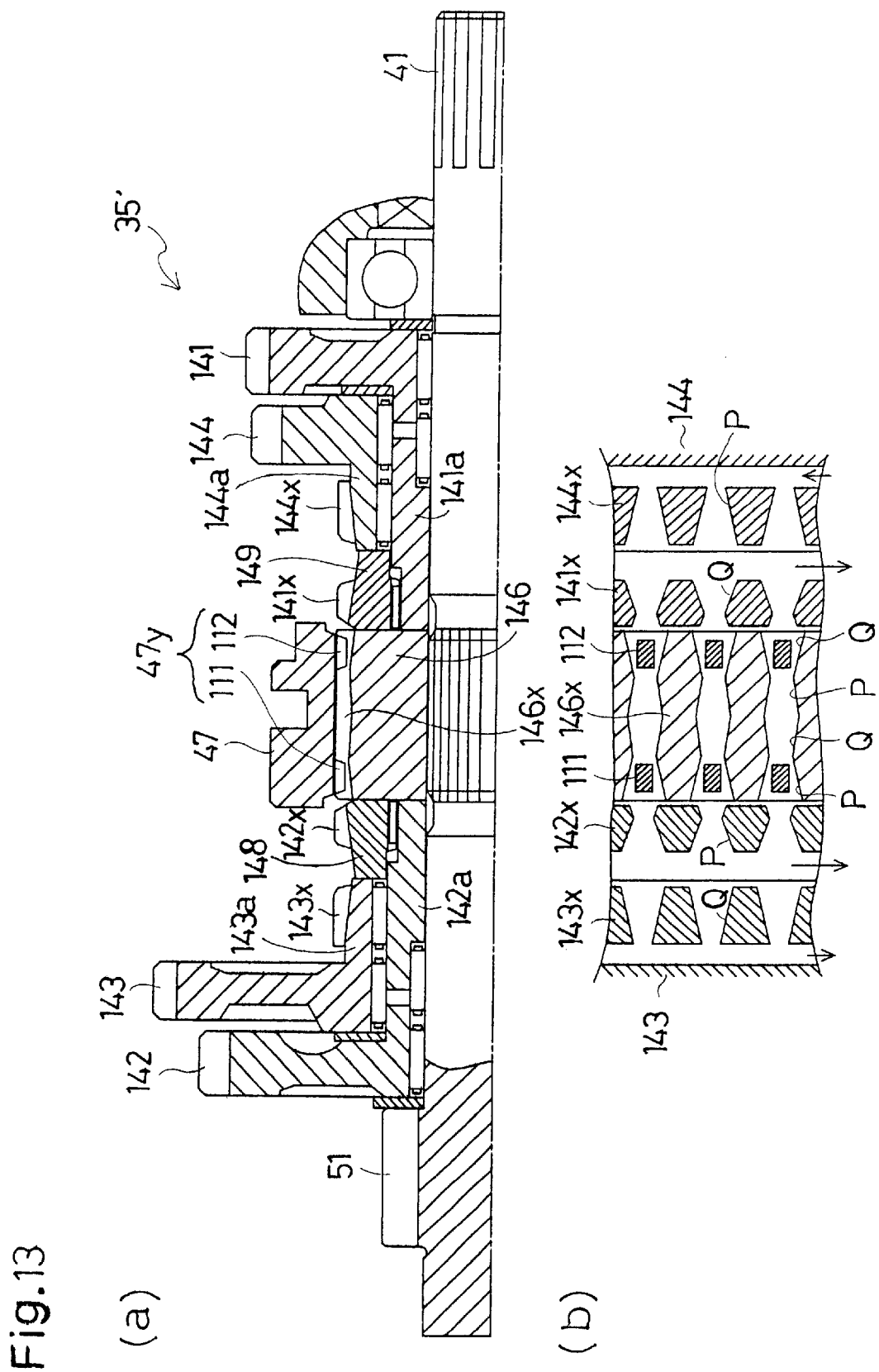
FIG. 13(a) is a fragmentary sectional rear view of a third embodiment of a constantly meshing gear transmission set in a neutral mode, and (b) is a fragmentary sectional plan view of the same.

Description will now be given of a sub speed changing gearing 35' according to a third embodiment shown in FIG. 13. Sub speed changing gearing 35' of FIG. 13 is provided with three gear trains for forward traveling and one gear train for backward traveling. A high speed driven gear 141 and a reverse driven gear 144 are relatively rotatably disposed around transmission shaft 41 substantially symmetrically to a low speed driven gear 143 and a middle speed driven gear 142 constructed similarly to low speed driven gear 43 and high speed driven gear 42 shown in FIGS. 5 to 9, with respect to a splined hub 146 serving as modified splined hub 46.

As shown in FIG. 13(a), middle speed driven gear 142 is relatively rotatably disposed on transmission shaft 41 and extends a boss 142a close to splined hub 146 along transmission shaft 41. A splined hub 148 is fitted with splines onto the end portion of boss 142a adjacent to splined hub 146 and is provided on the outer periphery thereof with male splines 142x.

Low speed driven gear 143 is relatively rotatably disposed on boss 142a between middle speed driven gear 142 and splined hub 148. Low speed driven gear 143 is disposed adjacent to middle speed driven gear 142 and extends a boss 143a along boss 142a close to splined hub 148. Boss 143a is provided on the outer periphery thereof with male splines 143x.

Approximately symmetrically to middle speed driven gear 142, high speed driven gear 141 is relatively rotatably disposed on transmission shaft 41 and extends a boss 141a close to splined hub 146 along transmission shaft 41 oppositely to boss 142a. A splined hub 149 is fitted with splines onto the end portion of boss 141a adjacent to splined hub 146 and is provided on the outer periphery thereof with male splines 141x.

Approximately symmetrically to low speed driven gear 143, reverse driven gear 144 is relatively rotatably disposed on boss 141a between high speed driven gear 141 and splined hub 149. Reverse driven gear 144 is disposed adjacent to high speed driven gear 141 and extends a boss 144a along boss 141a close to splined hub 149. Boss 144a is provided on the outer periphery thereof with male splines 144x.

Splined hub 146 is provided on the outer periphery thereof with male splines 146x. Clutch slider 47 is not-relatively rotatably but axially slidably provided on splined hub 146. Clutch slider 47 is provided on the inner periphery thereof with first and second teeth 111 and 112, which are disposed among male splines 146x originally (i.e., in the neutral mode).

For retaining clutch slider 47 in either the middle speed forward traveling position or the low speed forward traveling position, male splines 142x and 143x are tapered similarly to above-mentioned male splines 42x and 43x. That is, one end portion of each male spline 142x toward male spline 146x is tapered so as to serve as a tapered portion Q narrowed toward male spline 146x. The remaining portion of each male spline 142x is tapered oppositely so as to serve as a tapered portion P narrowed toward male spline 143x. Each male spline 143x is axially tapered so as to serve as a tapered portion Q narrowed toward male spline 142x.

For retaining clutch slider 47 in either the high speed forward traveling position or the backward traveling position, male splines 141x and 144x are tapered oppositely to above-mentioned male splines 42x and 43x. That is, one end portion of each male spline 141x toward male spline 146x is tapered so as to serve as a tapered portion P narrowed toward male spline 146x. The remaining portion of each male spline 141x is tapered oppositely so as to serve as a tapered portion Q narrowed toward male spline 144x. Each male spline 144x is axially tapered so as to serve as a tapered portion P narrowed toward male spline 141x.

Each male spline 146x has two sets of continuous tapered portions P and Q. A first (in FIG. 13, left) set is adjacent to male spline 142x so that tapered portion P of the first set is disposed between tapered portion Q of male spline 142x and tapered portion Q of the first set. A second (in FIG. 13, right) set is adjacent to male spline 141x so that tapered portion Q of the second set is disposed between tapered portion P of male spline 141x and tapered portion P of the second set.

For setting sub speed changing gearing 35' in the low or middle speed forward traveling mode, clutch slider 47 is located so that first teeth 111 are put among either male splines 142x or male splines 143x while second teeth 112 remain among male splines 146x. In the middle speed forward traveling mode, first teeth 111 abut against respective tapered portions P of male splines 142x while second teeth 112 abut against the first set of tapered portions Q of male splines 146x respectively. In the low speed forward traveling mode, first teeth 111 abut against respective male splines 143x serving as tapered portions Q while second teeth 112 abut against the first set of tapered portions P of male splines 146x respectively.

For setting sub speed changing gearing 35' in the high speed forward traveling mode or the backward traveling mode, clutch slider 47 is located so that second teeth 112 are put among either male splines 141x or male splines 144x while first teeth 111 remain among male splines 146x. In the high speed forward traveling mode, second teeth 112 abut against respective tapered portions Q of male splines 141x while first teeth 111 abut against the second set of tapered portions P of male splines 146x respectively. In the backward traveling mode, second teeth 112 abut against respective male splines 144x serving as tapered portions P while first teeth 111 abut against the second set of tapered portions Q of male splines 146x respectively.

Thus, in each of the above-mentioned four traveling modes, either first teeth 111 or second teeth 112 in each female spline 47y abuts against tapered portion P of any male spline, and the other abuts against tapered portion Q of any male spline, so that first teeth 111 and second teeth 112 are forced oppositely to each other in each female spline 47y when vehicle 1 travels, thereby retaining clutch slider 47 stably.

If possible, each of hubs and gears 46, 42, 43, 44, 146, 141, 142, 143, and 144 may be provided with only one male spline. To correspond to the single male spline, two female splines 47y may be provided on clutch slider 47 so as to guide and retain the male spline of each of the hubs and gears therebetween. On the contrary, only one female spline 47y may be provided on clutch slider 47 and each of the hubs and gears may be provided with two male splines so as to guide and retain female spline 47y therebetween.

It is further understood that the form of the present invention herein shown and described is to be taken as a preferred example of the same and that various changes in the shape, size and arrangement of parts may be resorted to without departing from the spirit of the present invention or the scope of the subjoined claims.

What is claimed is:

1. A gear retaining mechanism of a transmission, comprising:
   a rotary shaft;
   a hub fixed on said rotary shaft, said hub being provided on an outer periphery thereof with a male spline, said male spline of said hub having an axially tapered portion;
   a clutch slider axially slidably fitted on said hub, said clutch slider being provided on an inner periphery thereof with a female spline meshing with said male spline of said hub; and
   a gear relatively rotatably provided on said rotary shaft, said gear being provided on an outer periphery thereof with a male spline to mesh with said female spline of said clutch slider, said male spline of said gear having an axially tapered portion, wherein said clutch slider is slid along said rotary shaft and located so that said female spline, while meshing with said male spline of said hub, meshes with said male spline of said gear so as to fix said gear to said rotary shaft through said hub, and that said female spline abuts at opposite axial ends thereof against said tapered portion of said male spline of said gear and said tapered portion of said male spline of said hub so as to retain said clutch slider between said hub and said gear.

2. The gear retaining mechanism as set forth in claim 1, wherein, when said clutch slider fixes said gear to said rotary shaft through said hub, said tapered portion of said male spline of said gear abutting against said female spline of said clutch slider is narrowed in one axial direction, and said tapered portions of said male spline of said hub abutting against said female spline of said clutch slider is narrowed in the other axial direction.

3. The gear retaining mechanism as set forth in claim 2, wherein a plurality of gears serve as said gear.

4. The gear retaining mechanism as set forth in claim 1, wherein a plurality of gears serve as said gear, including said male spline having said tapered portion.

5. The gear retaining mechanism as set forth in claim 4, said female spline of said clutch slider being provided at opposite axial ends thereof with a first tooth and a second tooth, and further comprising:
   a first gear serving as one of said plurality of gears, wherein, when said clutch slider meshes with said first gear and said hub so as to select said first gear to be fixed to said rotary shaft, said first tooth abuts against said tapered portion of said male spline of said first gear, and said second tooth abuts against said tapered portion of said male spline of said hub; and
   a second gear serving as another of said plurality of gears, said male spline of said first gear being disposed between said male spline of said second gear and said male spline of said hub, wherein, when said clutch slider meshes with said second gear and said hub so as to select said second gear to be fixed to said rotary shaft, said first tooth abuts against said tapered portion of said male spline of said second gear, said second tooth abuts against said tapered portion of said male spline of said hub, and said male spline of said first gear is allowed to pass through a gap in said female spline of said clutch slider between said first tooth and said second tooth.

6. The gear retaining mechanism as set forth in claim 5, wherein, when said clutch slider meshes with said first gear and said hub so as to select said first gear to be fixed to said rotary shaft, said tapered portion of said male spline of said first gear abutting against said first tooth is narrowed axially oppositely to said tapered portion of said male spline of said hub abutting against said second tooth, and wherein, when said clutch slider meshes with said second gear and said hub so as to select said second gear to be fixed to said rotary shaft, said tapered portion of said male spline of said second gear abutting against said first tooth is narrowed axially oppositely to said tapered portion of said male spline of said hub abutting against said second tooth.

7. The gear retaining mechanism as set forth in claim 6, said male spline of said hub further comprising:
   a first tapered portion, wherein said second tooth of said female spline of said clutch slider abuts against said first tapered portion when said first tooth of said female spline of said clutch slider abuts against said tapered portion of said male spline of said first gear; and
   a second tapered portion, wherein said second tooth of said female spline of said clutch slider abuts against said second tapered portion when said first tooth of said female spline of said clutch slider abuts against said tapered portion of said male spline of said second gear.

8. The gear retaining mechanism as set forth in claim 7, wherein, in said male spline of said hub, said first tapered portion is narrowed axially oppositely to said second tapered portion.

9. The gear retaining mechanism as set forth in claim 5, wherein said clutch slider is enabled to mesh with said first gear, said second gear, and said hub together so as to fix both said first gear and said second gear to said rotary shaft.

10. The gear retaining mechanism as set forth in claim 5, further comprising:
    a third gear relatively rotatably provided on said rotary shaft, said third gear being provided on an outer periphery thereof with a male spline to mesh with said female spline of said clutch slider, wherein said male spline of said hub is disposed between said male spline of said first gear and said male spline of said third gear.

11. The gear retaining mechanism as set forth in claim 10, wherein said third gear also serves as one of said plurality of gears including said male spline having said tapered portion.

12. The gear retaining mechanism as set forth in claim 11, wherein, when said clutch slider meshes with said third gear and said hub so as to select said third gear to be fixed to said rotary shaft, said second tooth abuts against said tapered portion of said male spline of said third gear, and said first tooth abuts against said tapered portion of said male spline of said hub.

13. The gear retaining mechanism as set forth in claim 12, wherein, when said clutch slider meshes with said third gear and said hub so as to select said third gear to be fixed to said rotary shaft, said tapered portion of said male spline of said third gear abutting against said second tooth is narrowed axially oppositely to said tapered portion of said male spline of said hub abutting against said first tooth.

14. The gear retaining mechanism as set forth in claim 11, wherein said first and second gears have different rotary speeds in the same rotational direction, and said third gear is rotated oppositely to said first and second gears.

* * * * *